United States Patent
Coppinger et al.

(10) Patent No.: US 9,288,944 B2
(45) Date of Patent: Mar. 22, 2016

(54) REMOVABLE TROUGHS FOR A CLEANING SYSTEM OF AN AGRICULTURAL HARVESTER

(71) Applicant: CNH Industrial America LLC, New Holland, PA (US)

(72) Inventors: Jason R. Coppinger, Davenport, IA (US); Tyler D. Brockel, Bettendorf, IA (US); Craig E. Murray, Davenport, IA (US); William L. Cooksey, Geneseo, IL (US)

(73) Assignee: CNH Industrial America LLC, New Holland, PA (US)

( * ) Notice: Subject to any disclaimer, the term of this patent is extended or adjusted under 35 U.S.C. 154(b) by 129 days.

(21) Appl. No.: 14/266,247

(22) Filed: Apr. 30, 2014

(65) Prior Publication Data

US 2015/0313085 A1    Nov. 5, 2015

(51) Int. Cl.
- A01F 12/32 (2006.01)
- B07B 1/00 (2006.01)
- A01F 12/44 (2006.01)

(52) U.S. Cl.
CPC .................................... A01F 12/446 (2013.01)

(58) Field of Classification Search
CPC ....... A01F 12/44; A01F 12/24; A01F 12/185; A01D 61/002; B60P 1/40
USPC .................... 460/101, 114, 103, 100; 198/657
See application file for complete search history.

(56) References Cited

U.S. PATENT DOCUMENTS

| | | | |
|---|---|---|---|
| 2,743,728 A | 5/1956 | Carlson | |
| 3,101,721 A | 8/1963 | Fuller | |
| 3,470,881 A | 10/1969 | Knapp et al. | |
| 4,090,604 A * | 5/1978 | Reifert | B65D 90/54 198/657 |
| 4,128,160 A * | 12/1978 | Deal | B65G 33/24 138/163 |
| 4,436,518 A * | 3/1984 | Buss | B65G 11/026 193/2 R |
| 4,445,260 A * | 5/1984 | Buss | B65G 11/026 138/163 |
| 4,466,447 A | 8/1984 | Hoefer et al. | |
| 6,758,745 B2 | 7/2004 | Van Der Haegen et al. | |
| 7,395,650 B2 * | 7/2008 | Mossman | A01D 61/002 56/119 |
| 7,585,213 B2 * | 9/2009 | Claerhout | A01F 12/44 460/103 |
| 7,632,183 B2 | 12/2009 | Schmidt et al. | |
| 8,858,310 B2 | 10/2014 | Cooksey et al. | |
| 2003/0216159 A1 * | 11/2003 | Van Der Haegen | A01F 12/24 460/107 |
| 2004/0184905 A1 * | 9/2004 | Kinzenbaw | B60P 1/42 414/526 |
| 2006/0025188 A1 * | 2/2006 | Schmidt | A01F 12/52 460/114 |
| 2009/0186674 A1 | 7/2009 | Claerhout et al. | |
| 2009/0215510 A1 * | 8/2009 | Schmidt | A01F 12/44 460/109 |
| 2009/0280876 A1 * | 11/2009 | Yoder | A01F 12/444 460/100 |

FOREIGN PATENT DOCUMENTS

DE         3502014 A1    7/1986

* cited by examiner

Primary Examiner — Árpád Fábián-Kovács
(74) Attorney, Agent, or Firm — Patrick M. Sheldrake

(57) ABSTRACT

A cleaning system for use in an agricultural harvester includes a sieve and an auger arrangement positioned below the sieve. The auger arrangement includes an auger, an end plate carrying the auger and having a curved slot positioned radially outside of the auger, a deformable seal associated with the curved slot, a trough having an inner side wall, and an elongate removable pull out which is slidable through the curved slot adjacent to the inner side wall. The removable pull out and the deformable seal together being configured to prevent exit and entry of loose particles through the curved slot.

18 Claims, 4 Drawing Sheets

REMOVABLE TROUGHS FOR A CLEANING SYSTEM OF AN AGRICULTURAL HARVESTER

BACKGROUND OF THE INVENTION

1. Field of the Invention

The present invention relates to agricultural harvesters, and, more particularly, to auger arrangements used in a cleaning system of an agricultural harvester.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Clean grain eventually falls to a clean grain auger trough with a clean grain auger to move the clean grain towards a grain elevator, while tailings fall to a tailings auger trough to be reintroduced into the cleaning system by a tailings auger and return auger.

The troughs that hold the clean grain and tailings can become dirty and require cleaning. As the cleaning systems are fairly tight spaces with many parts, removing an entire trough can be difficult and require a significant amount of time. Prior art devices have provided troughs that are bolted or hinged to the combine harvester and can be unhinged to access the trough from the bottom of the combine. This can be inconvenient as the user needs to get under the combine to open the trough for access.

What is needed in the art is a trough for a cleaning system of an agricultural harvester that can be easily cleaned.

SUMMARY OF THE INVENTION

The present invention provides an agricultural harvester that has a cleaning system with a removable pull out which acts as a trough bottom and seals a curved slot along with a deformable seal.

The invention in one form is directed to a cleaning system for an agricultural harvester that includes a sieve and an auger arrangement positioned below the sieve. The auger arrangement includes an auger, an end plate carrying the auger that has a curved slot positioned radially outside of the auger, a deformable seal associated with the curved slot, a trough with an inner side wall, and an elongate removable pull out. The removable pull out is slidable through the curved slot adjacent to the inner side wall and the removable pull out and deformable seal together being configured to prevent exit and entry of loose particles through the curved slot. Channels can also be formed on the inner side wall of the trough that partially surround the removable pull out when inserted through the curved slot. The removable pull out can have an edge with serrations that are configured to remove impacted particles from the channels.

The invention in another form is directed to an agricultural harvester that includes a chassis and a cleaning system carried by the chassis. The cleaning system includes a sieve and an auger arrangement positioned below the sieve. The auger arrangement includes an auger, an end plate carrying the auger that has a curved slot positioned radially outside of the auger, a deformable seal associated with the curved slot, a trough with an inner side wall, and an elongate removable pull out. The removable pull out is slidable through the curved slot adjacent to the inner side wall and the removable pull out and deformable seal together being configured to prevent exit and entry of loose particles through the curved slot.

An advantage of the present invention is that the removable pull out can provide an easily removed trough for the cleaning system.

Another advantage is that the removable pull out and deformable seal together limit the exit and entry of loose particles into the cleaning system.

Yet another advantage is the removable pull out can have an edge with serrations that self-clean guide channels when the pull out is removed from the cleaning system.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
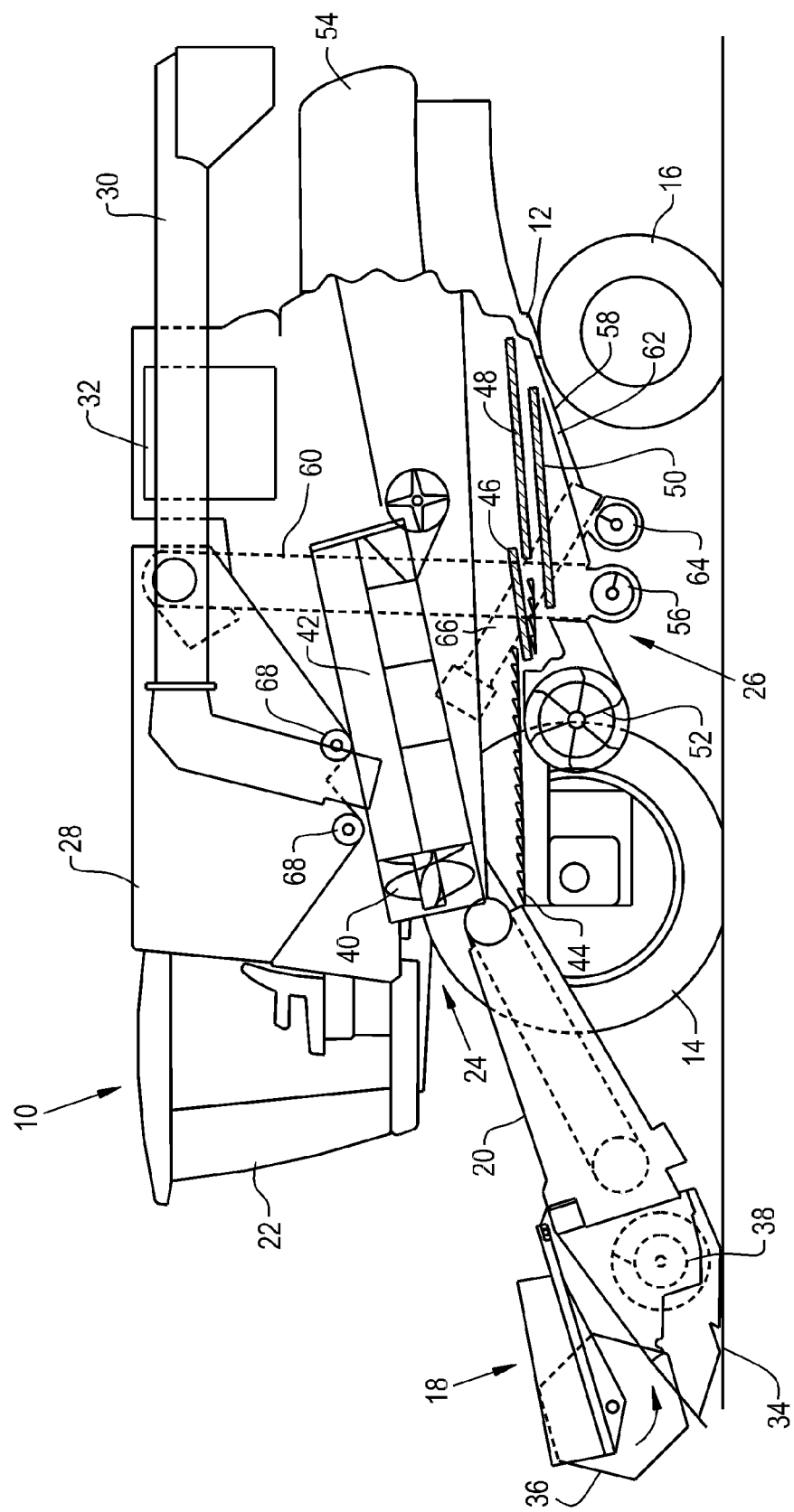
FIG. 1 is a perspective view of an agricultural harvester in the form of a combine which can include a cleaning system of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
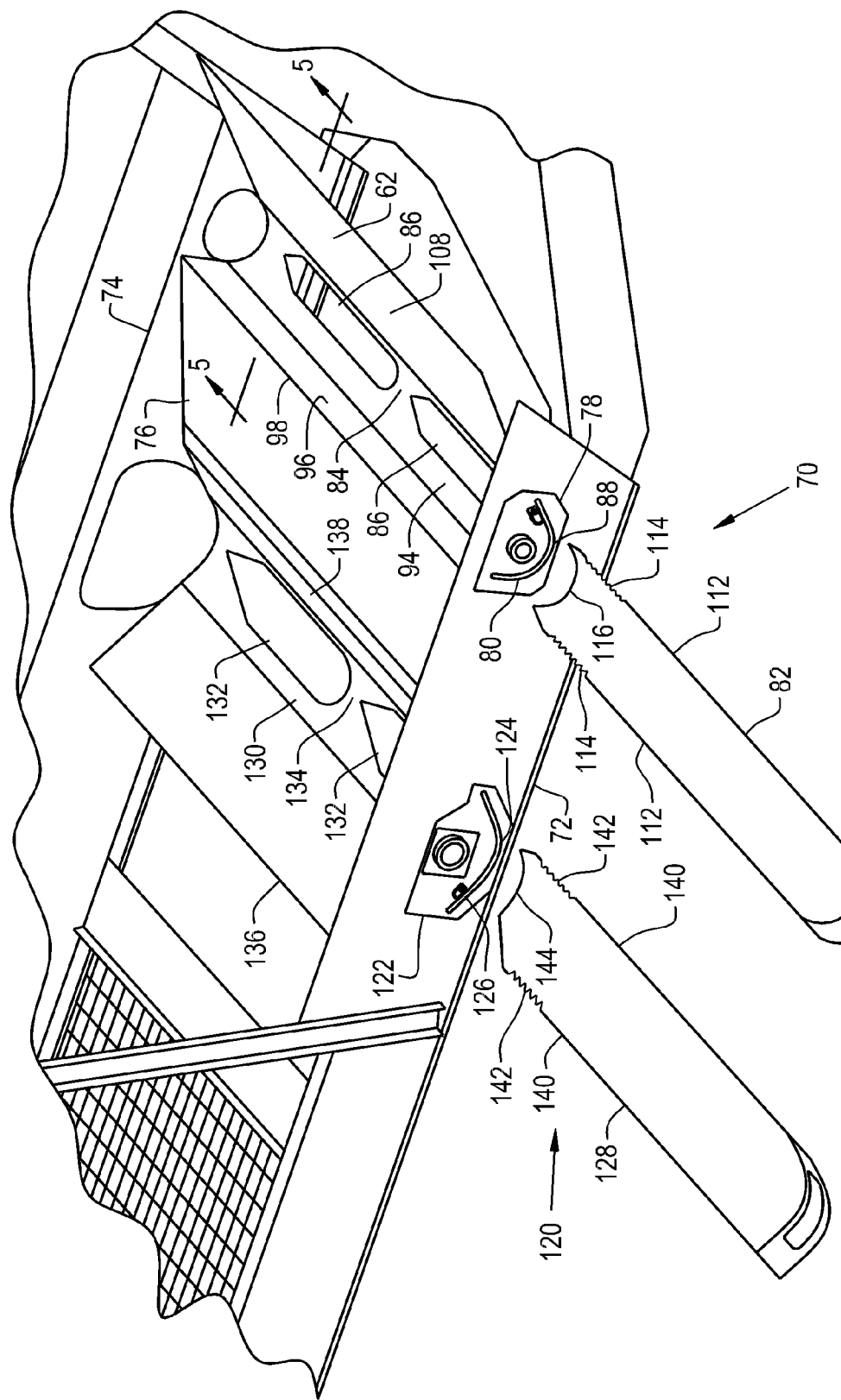
FIG. 2 is an exploded perspective view of an embodiment of an auger arrangement according to the present invention.

Referring now to FIG. 2, a portion of cleaning system 26 with auger arrangements 70 and 120 is shown in accordance with the present invention. The clean grain auger 56 and tailings auger 64 shown in FIG. 1 are intentionally not shown in FIG. 2 so that more detail can be seen, but would normally be present during use. The augers 56, 64 would be located between a sill 72 and an end wall 74 which has openings that allow the augers 56, 64 to transport clean grain and tailings, respectively, to their next destination. There is a partition 76 between the sill 72 and end wall 74 separating the side which houses the tailings auger 64 and the side which houses the clean grain auger 56. For ease of reference, most of the following discussion will focus on auger arrangement 70 which is on the side of the cleaning system 26 which houses the tailings auger 64, but an analogous auger arrangement 120 can be utilized on the side which houses the clean grain auger 56.

The tailings auger 64 has bearings (not shown) that are mounted to an end plate 78 connected to the sill 72. The end plate 78 is shown as being bolted to the sill 72, but could be connected in other ways if desired. The end plate 78 has a curved slot 80 formed through, and the sill 72 has a similarly shaped sill slot (not shown) formed through that aligns with the curved slot 80. The sill slot does not need to be sized and shaped similarly to the curved slot 80, and could be significantly larger and/or different shaped than the curved slot 80 if desired. A removable pull out 82 can slide in and out of the curved slot 80 and sill slot, and acts as a cover for a bottom 84 of the tailings auger trough 62. The curved slot 80 and sill slot should be shaped and placed so that the removable pull out 82 is inserted and removed generally parallel to the tailings auger 64 in an area radially outside of the outer radius of the auger 64, so that the removable pull out 82 is not interfering with or contacting the auger 64 during operation. The removable pull out 82 can be formed of any material, with ultra-high molecular weight polyethylene (UHMW) being a particularly useful material due to its wear characteristics and resistance to petroleum products.

As can be seen, the tailings auger trough 62 has openings 86 formed in the bottom 84 of the trough 62 which allow leftover particles to fall through when the removable pull out 82 is not covering the openings 86. The removable pull out 82 has a shape, shown as a concave in FIGS. 2-4, that closely matches the profile of the curved slot 80 and sill slot, to reduce the entry and exit of loose particles through the curved slot 80 and sill slot during operation as well as reduce movement of the removable pull out 82 in the curved slot 80 and sill slot. As used throughout, "loose particles" mostly refers to crop particles, including clean grain and tailings, and dirt that would commonly be encountered during a farming operation, but can mean other small particles that want to be kept in or out of the cleaning system 26.

Figure 3:
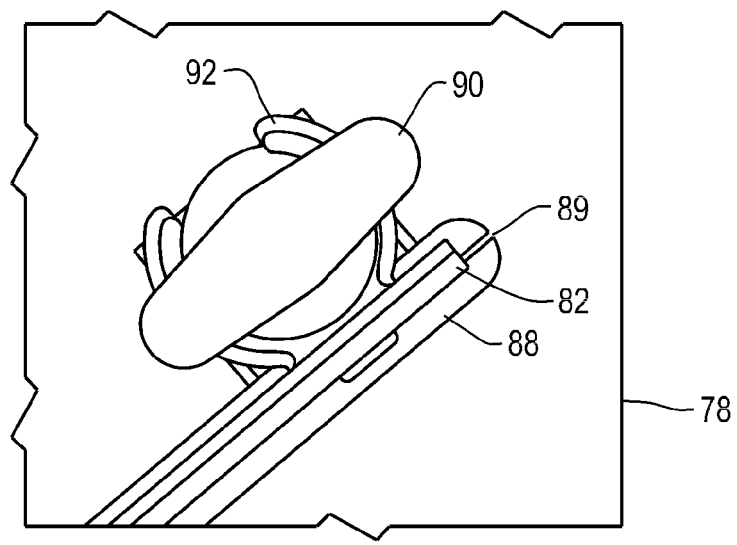
FIG. 3 is a fragmentary view of the auger arrangement shown in FIG. 2.

Even though the removable pull out 82 has a shape closely matching the profile of the curved slot 80 and sill slot, there can be gaps formed between the pull out 82, the curved slot 80 and the sill slot. Such gaps are formed due to tolerance stack up of the parts used in the cleaning system 26 and allow for the undesirable entry or exit of loose particles through the curved slot 80. To reduce the impact of gaps being formed, a deformable seal 88 is associated with the curved slot 80 to conform around the removable pull out 82 and form a seal that can reduce the entry and exit of loose particles through the curved slot 80. As shown in FIG. 3, the deformable seal 88 can be a rubber pad that is pressed between the end plate 78 and the sill 72. The rubber pad 88 has a narrow slit 89 cut in that is aligned with the curved slot 80 and sill slot, but is considerably smaller. For example, the curved slot 80 and sill slot can each have a width of around 10-15 mm and the removable pull out 82 can have a thickness of around 2-5 mm. In such a case, the narrow slit 89 cut in the rubber pad 88 could have a width of around 1-1.5 mm and be aligned in the center of the curved slot 80 and sill slot. These dimensions are given only as an example of a possible configuration of the present invention and are not meant to limit the scope of the invention in any manner. Since the thickness of the removable pull out 82 is greater than the width of the narrow slit 89 cut in the rubber pad 88, the rubber pad 88 will stretch over the removable pull out 82 and form a seal around the removable pull out 82 when the removable pull out 82 is inserted through the curved slot 80 and sill slot. The rubber pad 88 acts to not only form a seal around the removable pull out 82, but because the tailings auger 56 has bearings mounted to the end plate 78 the rubber pad 88 can also act as a vibrational dampener for the bearings, which can extend the life of the bearings. This auger arrangement 70 therefore allows for easy removal of the removable pull out 82 to clean the trough 62 while maintaining a seal around the removable pull out to prevent the exit and entry of loose particles through the curved slot 80.

Figure 4:
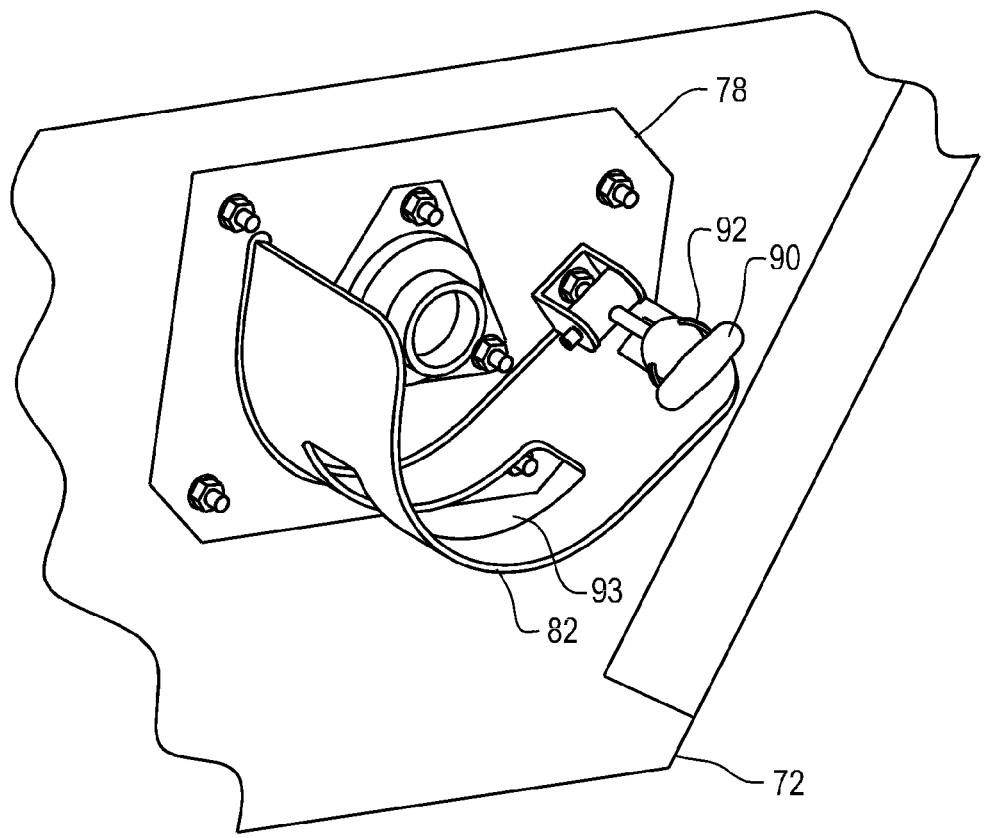
FIG. 4 is a perspective view of a portion of the auger arrangement shown in FIGS. 2 and 3.

As shown in FIGS. 3 and 4, a latch 90 can be attached to the end plate 78 that corresponds to a catch 92 formed on the removable pull out 82. When the removable pull out 82 is fully inserted in the removable slot 80, the latch 90 can be pivoted into the catch 92 to secure the removable pull out 82 within the curved slot 80 and reduce the risk of the removable pull out 82 being undesirably removed. The latch 90 can then be pivoted back toward the end plate 78 from the catch 92 to release the removable pull out 82 and slide it out of the curved slot 80. If desired, a handle opening 93 can be formed in the removable pull out 82 to provide a gripping surface on the removable pull out 82, making the removable pull out 82 easier to insert and remove from the curved slot 80.

Figure 5:
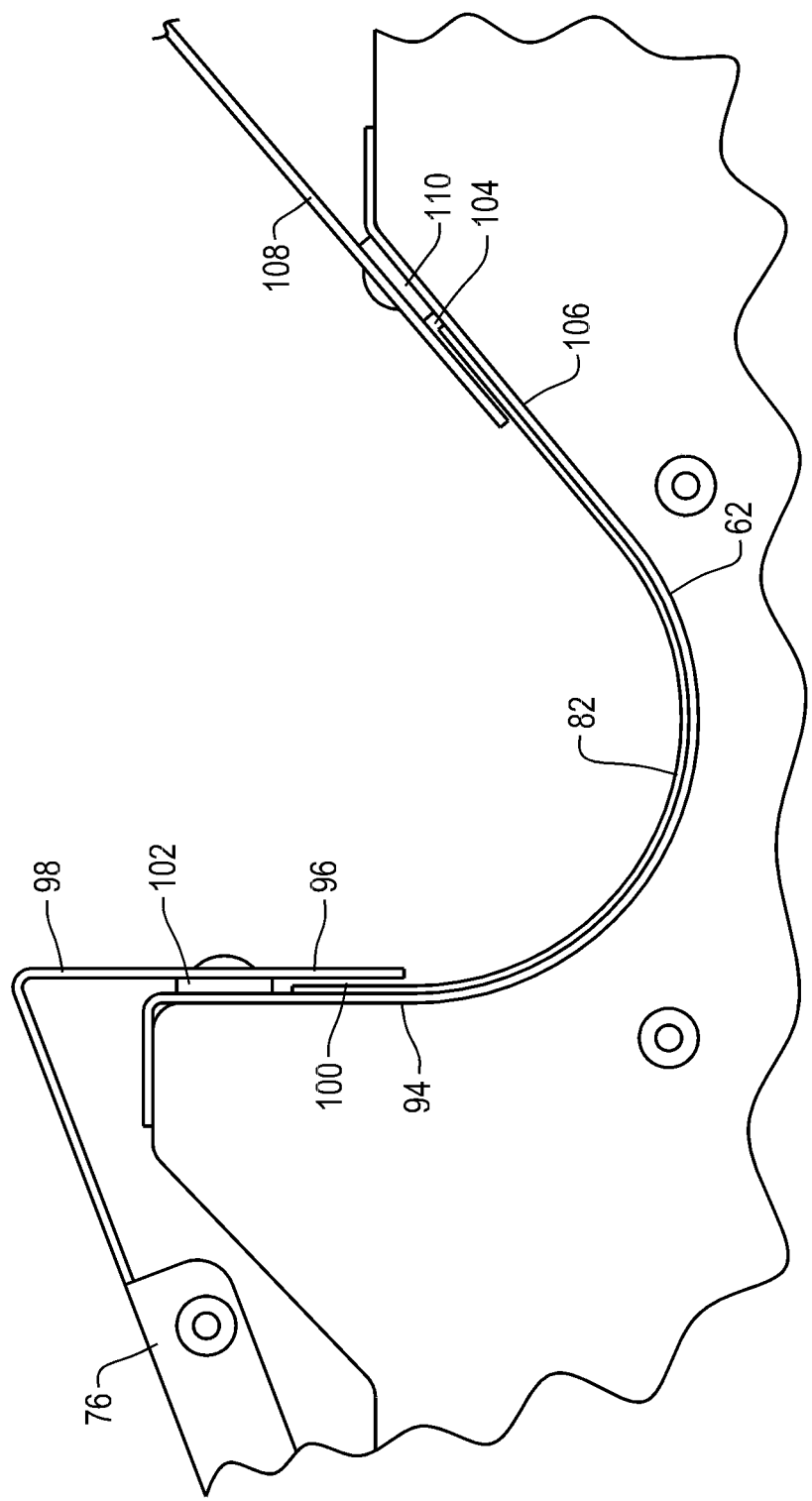
FIG. 5 is a sectional view of one of the troughs in the auger arrangement according to the present invention, taken along line 5-5 in FIG. 2, with the pull out installed.

Referring now to FIG. 5, the tailings auger trough 62 is shown in a sectional view without the sill 72 or end plate 78 being visible. As can be seen, the removable pull out 82 is inserted and covering the openings 86 (shown in FIG. 2) formed in the trough 62. The trough 62 has an inner side wall 94 that the removable pull out 82 will rest on and/or adjacent to while it acts as the bottom of the trough 62. A channel wall 96 can be formed by a sheet 98 attached to the partition 76 that is shown extending parallel to the inner side wall 94, forming a channel 100. The sheet 98 could also extend in a non-parallel fashion relative to the inner side wall 94 to form the channel 100. The sheet 98 can be an integral part of the partition 76 or can be a separate piece that is attached to the partition 76. The removable pull out 82 can slide within the channel 100 and rest within the channel 100 when it is not moving. A spacer strip 102 can be attached to the inner side wall 94 between the inner side wall 94 and the sheet 98 to seal the channel 100 and keep the width of the channel 100 large enough so that the removable pull out 82 can easily slide in and out of the channel 100. The channel 100 can extend along the whole length of the inner side wall 94 or only a portion, if desired. The channel 100 could also be formed as a cut into the inner side wall 94. A second channel 104 can be formed on another inner side wall 106 of the trough 62. The second channel 104 can be formed with a second sheet 108 and a second spacer strip 110, similarly to the channel 100. The channels 100, 104, if included, have some space between the walls 94, 96, 106, 108 of the channels 100, 104 and the removable pull out 82 so that the removable pull out 82 can easily slide in and out of the channels 100, 104, which would be more difficult if the channels 100, 104 did not have some leeway.

Since the channels 100, 104 can have some leeway between their walls 94, 96, 106, 108 and the removable pull out 82, particles such as dirt and debris can become impacted into the channels 100, 104 and make removal or insertion of the pull out 82 difficult. As such, the removable pull out 82 can have edges 112 that include serrations 114 on the edges 112. The serrations 114 can extend away from the removable pull out 82, as shown in FIG. 2, or be flush with the edges 112. The serrations 114 can extend a small distance away from the edges 112 of the pull out 82, such as 0.5 to 1.5 mm. As the removable pull out 82 is removed from the channel(s) 100, 104, the serrations 114 can scrape and cut through impacted particles that are in the channel(s) 100, 104. The serrations 114 are preferably placed near a distal end 116 of the removable pull out 82 so that as the pull out 82 is being removed, the serrations 114 will scrape almost the entirety of the channel(s) 100, 104 and pull the impacted particles out of the channel(s) 100, 104 when the pull out 82 is completely removed from the cleaning system 26. The serrations 114 therefore act as a cleaning mechanism for the channel(s) 100, 104 without requiring a separate tool to remove the impacted particles.

As mentioned, the auger arrangement 70 previously described and shown in FIGS. 3-5 is configured for use on the side of the cleaning system 26 which houses the tailings auger 64. An analogous auger arrangement 120 could be employed on the side of the cleaning system 26 which houses the clean grain auger 56. As can be seen in FIG. 2, auger arrangement 120 includes analogous components to auger arrangement 70 including an end plate 122 that is attached to the sill 72 and has a curved slot 124, a deformable seal 126 pressed between the end plate 122 and the sill 72 with a narrow slit (not shown) cut through, and a removable pull out 128 that can be inserted and removed through the curved slot 124 and another sill slot (not shown) that is aligned with the curved slot 124. As can be seen, the curved slot 124 and removable pull out 128 have a complementary profile, shown as a concave, to a clean grain trough 130. The clean grain trough 130, as shown, has less curvature than the tailings trough 62, so the removable pull out 128 and curved slot 124 have a less curved shape than analogous removable pull out 82 and curved slot 80. The curved slot 124 is shaped and located so that the removable pull out 128 will be generally parallel to the clean grain auger 56 when inserted through the curved slot 124 and will lie outside an outer radius of the clean grain auger 56 such that the removable pull out 128 does not interfere with the clean grain auger 56 during operation. The clean grain trough 130 can have openings 132 formed through a bottom 134 of the trough 130, which allow clean grain to fall through when the removable pull out 128 is removed. An inclined sheet 136 between the sill 72 and end wall 74 can be attached to an inner side wall (not shown) of the clean grain trough 130 to form a channel (not shown) similarly to the channel 100 formed in auger arrangement 70. Another sheet 138 can be attached to the partition 76 and another inner side wall (not shown) of the clean grain trough 130 to form another channel (not shown) similarly to the channel 104 formed in auger arrangement 70. The removable pull out 128 can have edges 140 with serrations 142 formed near a distal end 144 of the removable pull out 128, similar to the removable pull out 82. The serrations 142 can clean out the channels of auger arrangement 120 in a similar manner to the serrations 114 on removable pull out 82.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cleaning system for use in an agricultural harvester, comprising:
   a sieve; and
   an auger arrangement positioned below said sieve, said auger arrangement including an auger, an end plate carrying said auger and having a curved slot positioned radially outside of the auger, a deformable seal associated with said curved slot, a trough having an inner side wall, and an elongate removable pull out which is slidable through said curved slot adjacent to said inner side wall, said removable pull out and said deformable seal together being configured to prevent exit and entry of loose particles through said curved slot.

2. The cleaning system according to claim 1, wherein said trough has a channel formed on said inner side wall configured to surround a portion of said removable pull out.

3. The cleaning system according to claim 2, further including a spacer attached to said inner side wall and a channel wall attached to said spacer, said inner side wall, said spacer and said channel wall forming said channel.

4. The cleaning system according to claim 2, wherein said removable pull out has an edge with at least one serration formed thereon.

5. The cleaning system according to claim 4, wherein said at least one serration extends away from said edge.

6. The cleaning system according to claim 4, wherein said at least one serration is configured to remove impacted particles from said channel.

7. The cleaning system according to claim 1, further including a sill that said end plate is attached to and having a sill slot aligned with said curved slot, said deformable seal being pressed between said end plate and said sill.

8. The cleaning system according to claim 7, wherein said deformable seal is a rubber pad having a narrow slit formed therethrough, said narrow slit being aligned with said curved slot and said sill slot.

9. The cleaning system according to claim 1, wherein said trough has a bottom and at least one opening formed through said bottom.

10. The cleaning system according to claim 9, wherein said removable pull out covers said at least one opening.

11. The cleaning system according to claim 1, further including a latch attached to said end plate and a catch on said removable pull out.

12. The cleaning system according to claim 1, wherein said curved slot has a concave shape.

13. The cleaning system according to claim 12, wherein said removable pull out has a profile that closely corresponds to said concave shape.

14. The cleaning system according to claim 1, wherein said auger is one of a clean grain auger and a tailings auger.

15. The cleaning system according to claim 1, wherein said removable pull out is composed of ultra-high molecular weight polyethylene.

16. An agricultural harvester, comprising:
   a chassis; and
   a cleaning system carried by said chassis, said cleaning system including:
      a sieve; and
      an auger arrangement positioned below said sieve, said auger arrangement including an auger, an end plate carrying said auger and having a curved slot positioned radially outside of the auger, a deformable seal associated with said curved slot, a trough having an inner side wall, and an elongate removable pull out which is slidable through said curved slot adjacent to said inner side wall, said removable pull out and said deformable seal together being configured to prevent exit and entry of loose particles through said curved slot.

17. The agricultural harvester according to claim 16, wherein said auger is one of a clean grain auger and a tailings auger.

18. The agricultural harvester according to claim 16, wherein said agricultural harvester is a combine harvester.

* * * * *